United States Patent
Terasawa et al.

(10) Patent No.: US 10,756,605 B2
(45) Date of Patent: Aug. 25, 2020

(54) SQUIRREL-CAGE INDUCTION MOTOR, AND METHOD FOR MANUFACTURING SQUIRREL-CAGE INDUCTION MOTOR

(71) Applicant: Mitsubishi Electric Corporation, Chiyoda-ku, Tokyo (JP)

(72) Inventors: Hideo Terasawa, Tokyo (JP); Kenichi Nakagawa, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 359 days.

(21) Appl. No.: 15/543,255

(22) PCT Filed: Jan. 19, 2015

(86) PCT No.: PCT/JP2015/051220
§ 371 (c)(1),
(2) Date: Jul. 13, 2017

(87) PCT Pub. No.: WO2016/117003
PCT Pub. Date: Jul. 28, 2016

(65) Prior Publication Data
US 2018/0006537 A1 Jan. 4, 2018

(51) Int. Cl.
*H02K 17/00* (2006.01)
*H02K 17/16* (2006.01)
(Continued)

(52) U.S. Cl.
CPC ........... *H02K 17/165* (2013.01); *H02K 1/265* (2013.01); *H02K 15/0012* (2013.01);
(Continued)

(58) Field of Classification Search
CPC .............................. H02K 17/162; H02K 1/265
(Continued)

(56) References Cited

U.S. PATENT DOCUMENTS

| | | | | |
|---|---|---|---|---|
| 2,292,167 A | * | 8/1942 | Smith | H02K 17/16 310/212 |
| 3,832,583 A | * | 8/1974 | Chang | H02K 3/48 310/201 |

(Continued)

FOREIGN PATENT DOCUMENTS

| | | |
|---|---|---|
| JP | S56-136465 U | 10/1981 |
| JP | S58-121150 U | 8/1983 |

(Continued)

OTHER PUBLICATIONS

Office Action dated Jan. 28, 2019, by the Chinese Patent Office in corresponding Chinese Patent Application No. 201580073213.X and English translation of the Office Action. (17 pages).
(Continued)

*Primary Examiner* — Alexander Talpalatski
(74) *Attorney, Agent, or Firm* — Buchanan Ingersoll & Rooney PC

(57) ABSTRACT

Core slots are provided in an outer circumferential side of a rotor core and extend in an axial direction of a rotor shaft. A rotor conductor is a rod-shaped conductor inserted in each of the slots, and after insertion of the rotor conductor in each slot, a flared portion is formed flaring in a slot-transverse direction, and a propping-apart force occurring between the flared portion and both side wall surfaces of the slot fixes the rotor conductor to the slot. In an inner wall of an outer circumferential side of each slot abutting the flared portion, an unevenness is arranged along the axial direction of the rotor shaft.

22 Claims, 8 Drawing Sheets

(51) Int. Cl.
*H02K 1/26* (2006.01)
*H02K 15/00* (2006.01)
*H02K 15/02* (2006.01)
*H02K 21/46* (2006.01)

(52) U.S. Cl.
CPC ......... *H02K 15/0031* (2013.01); *H02K 17/16* (2013.01); *H02K 15/028* (2013.01); *H02K 21/46* (2013.01)

(58) Field of Classification Search
USPC ........................................................ 310/211
See application file for complete search history.

(56) References Cited

U.S. PATENT DOCUMENTS

| | | | | |
|---|---|---|---|---|
| 6,092,277 | A | 7/2000 | Beltowski et al. | |
| 8,575,813 | B2* | 11/2013 | Kleber | H02K 15/0012 |
| | | | | 310/125 |
| 8,631,559 | B2* | 1/2014 | Meyer | H02K 15/0012 |
| | | | | 29/598 |
| 2014/0252910 | A1* | 9/2014 | Kunihiro | H02K 17/165 |
| | | | | 310/211 |

FOREIGN PATENT DOCUMENTS

| | | |
|---|---|---|
| JP | 3-45071 U | 4/1991 |
| JP | 6-284608 A | 10/1994 |
| JP | 10-150736 A | 6/1998 |
| JP | 10-322990 A | 12/1998 |
| JP | 2007-252073 A | 9/2007 |

OTHER PUBLICATIONS

Office Action (Notification of Reasons for Rejection) dated Sep. 12, 2017, by the Japanese Patent Office in corresponding Japanese Patent Application No. 2016-570222 and English translation of the Office Action. (8 pages).
International Search Report (PCT/ISA/210) dated Mar. 31, 2015, by the Japanese Patent Office as the International Searching Authority for International Application No. PCT/JP2015/051220.
Written Opinion (PCT/ISA/237) dated Mar. 31, 2015, by the Japanese Patent Office as the International Searching Authority for International Application No. PCT/JP2015/051220.
Extended European Search Report dated Aug. 14, 2018, issued by the European Patent Office in corresponding European Application No. 15878699.6. (10 pages).
Office Action dated Sep. 20, 2018, by the Chinese Patent Office in corresponding Chinese Patent Application No. 201580073213.X and English translation of the Office Action. (18 pages).

* cited by examiner

SQUIRREL-CAGE INDUCTION MOTOR, AND METHOD FOR MANUFACTURING SQUIRREL-CAGE INDUCTION MOTOR

TECHNICAL FIELD

The present disclosure relates to a squirrel-cage induction motor and a method for manufacturing the squirrel-cage induction motor.

BACKGROUND ART

Slots are arranged in an outer circumferential side of a rotor core of a squirrel-cage induction motor, and a rod-shaped rotor conductor is inserted in each of the slots. Ring-like conductors termed "short-circuiting rings" are connected to both ends of the rotary conductors inserted into each of the slots to form a squirrel-cage-shaped rotor conductor (squirrel-cage rotor). An induced voltage is generated in the rotor conductor due to intersection between the rotary magnetic field generated by stator coils and the rotor conductors within the rotor core slots. Due to the generated induced voltage, induced current flows in the rotor conductors forming a closed circuit, and magnetic poles are generated in the rotor core. A circumferential force is generated in the rotor due to the interaction between the magnetic poles of the rotor core and the magnetic poles of the rotary magnetic field. This force results in output torque of the rotor shaft of the induction motor.

The rotor conductor deforms due to rapid changes in the current induced by the rotary magnetic field, and the rotor conductor expands and contracts due to temperature changes due to the induced current. Further, the rotor conductor is affected by centrifugal force due to rotation and by external vibrations. Such deformation, expansion-contraction, centrifugal force, vibration, and the like of the rotor conductor generate movement of the rotor conductor relative to the rotor core.

To prevent relative movement between the rotor conductor and the rotor core, a shimming operation termed "swaging" is performed for fixing the rotor conductors relative to the slots of the rotor core. In this operation, a driving-in slot to be driving into by a chisel is provided in a transverse direction-central portion of the outer circumferential surface of the rotor conductor inserted in the rotor core slot. Due to this operation, the outer circumferential side of the rotor conductor expands in the slot transverse direction to form a flared portion. The expanded flared portion is in a state in which the expanded flared portion performs propping between the internal wall surfaces of either side of the rotor core slot, and due to the force of propping between the rotor conductor and the inner wall surfaces of the rotor core slot, the rotor conductor is fixed to the rotor core slot.

For example, Patent Literature 1 discloses a squirrel-cage induction motor in which a rotor conductor inserted in the rotor core slot is fixed by forming a driving-in slot in the rotor conductor (in particular, see FIG. 1 and FIG. 2). In this squirrel-cage induction motor, a first driving-in slot, which is a deep slot having a certain length, is arranged near the axial-direction central portion of the outer circumferential surface of the rotor conductor as a driving-in slot for securely fixing the rotor conductor to the rotor core slot. Further, a second driving-in slot, which is shallower than the first driving-in slot, is arranged at a position other than the vicinity of the axial-direction central portion of the outer circumferential surface of the rotor conductor. The rotor conductor expanded in the transverse direction during the forming of the first and second driving-in slots is fixed in a state in which the rotor conductor performs propping between both side wall surfaces of the rotor core slot. This portion fixing the rotor conductor is termed the "fixing portion".

CITATION LIST

Patent Literature

Patent Literature 1: Japanese Utility Model Application Kokai Publication No. H03-045071

SUMMARY OF INVENTION

Technical Problem

The rotor conductor expands and contracts due to repeated increase and decrease of temperature during operation above manner. Further, the rotor conductor during rotation is affected by centrifugal force. Due to forming of the rotor core as a laminate of bodies having identical slot widths, relative micro-movement is generated between the wall surfaces of the rotor core slot and the rotor conductor due to factors such as rotor conductor expansion-contraction and centrifugal force, and abrasion and micro-deformation of the fixing portion of the rotor conductor are generated over time. This may lessen the force of propping between the rotor conductor and the inner wall surfaces of the rotor core slot, and the rotor conductor may move within the rotor core slot in the axial direction of the rotor.

The present disclosure is developed in consideration of the aforementioned circumstances, and an objective of the present disclosure is to provide a squirrel-cage induction motor and a method for manufacturing the squirrel-cage induction motor that enable prevention of axial-direction movement of the rotor conductor even when the force of propping between the rotor conductor and both side wall surfaces of the rotor core slot decreases due to micro-deformation and abrasion over time.

Solution to Problem

In order to attain the aforementioned objective, the squirrel-cage induction motor according to the present disclosure has the below-described structure. Slots extending in the axial direction are arranged in the outer circumferential side of a rotor core. A rotor conductor is a rod-shaped conductor inserted in each of the slots; after insertion of the rotor conductor in the slot, a flared portion flaring in the transverse direction of the slot is formed in the rotor conductor; and the rotor conductor is fixed to the slot by a force of propping that occurs between the flared portion and both side wall surfaces of the each slot. An unevenness is arranged along the axial direction in the outer circumferential inner wall of the each slot contacting the flared portion.

Advantageous Effects of Invention

In the squirrel-cage induction motor of the present disclosure, an unevenness is provided along the axial direction in the inner wall of the outer circumferential side of the slot of the rotor core. Thus when the flared portion flaring in the transverse direction of the slot in order to fix the rotor conductor inserted in the slot of the rotor core is formed in the outer circumferential side of the rotor core, a difference, between a portion of the rotor conductor contacting a recess and a portion contacting a projection, occurs in the size of expansion in the rotor conductor transverse direction, and thus the unevenness is arranged also along the axial direction in the flared portion. Thus even if the force of propping-apart between the rotor conductor and both side wall surfaces of the rotor core slot is assumed to decrease due to micro-deformation and abrasion over time, movement of the rotor conductor relative to the rotor core in the axial direction can be prevented.

DESCRIPTION OF EMBODIMENTS

Embodiments of the present disclosure are described below in detail in reference to drawings.

Embodiment 1

Firstly, Embodiment 1 of the present disclosure is described.

Figure 1:
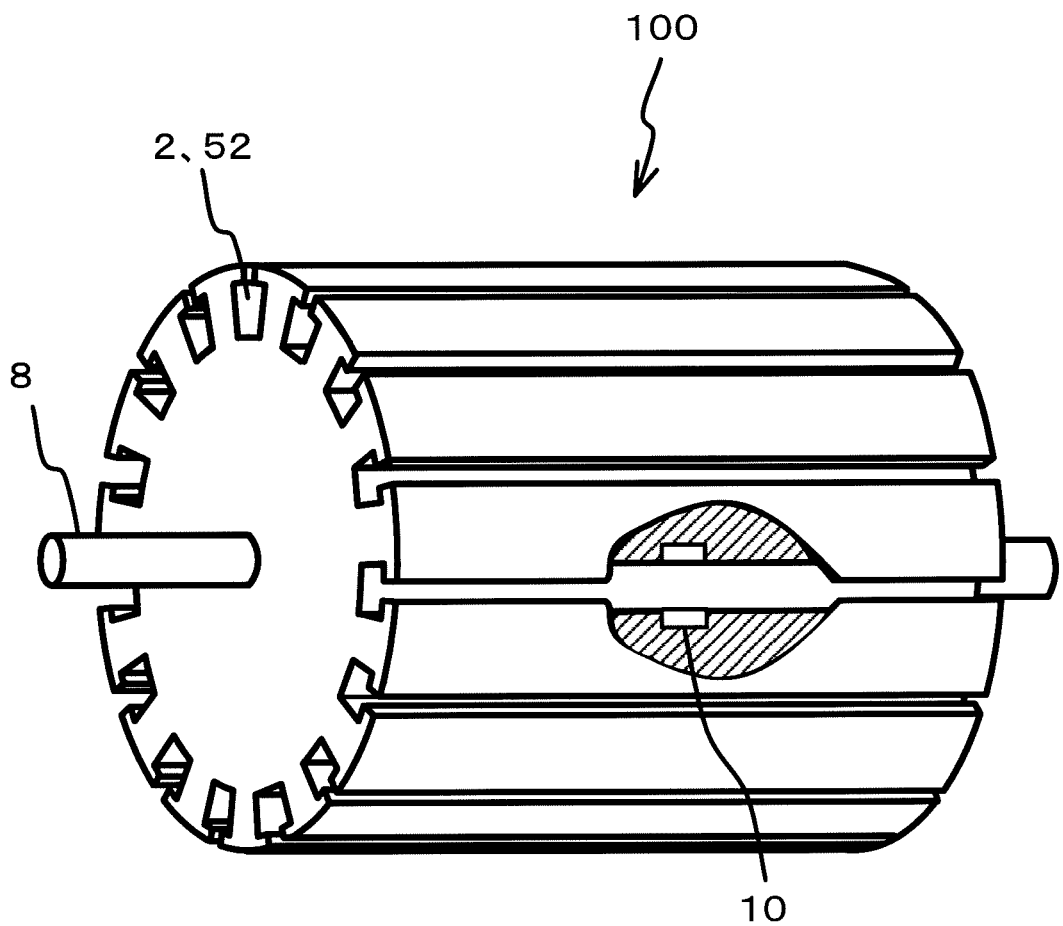
FIG. 1 is a perspective view illustrating overall configuration of a rotor core of a squirrel-cage induction motor according to Embodiment 1 of the present disclosure.

A squirrel-case induction motor according to this Embodiment 1, due to arrangement of an unevenness along an axial direction in an outer circumferential side of an inner wall of a rotor core slot, has a step arranged between a flared portion of a rotor conductor and the inner wall of the rotor core slot, and prevents axial-direction movement of the rotor conductor relative to a rotor core. FIG. 1 illustrates overall configuration of the rotor core of the squirrel-cage induction motor. As illustrated in FIG. 1, the rotor core 100 is a cylindrical pillar-shaped core having the same central axis as a rotor shaft 8. In the outer circumference of the rotor core 100, multiple sets of core slots 2 and 52 are arranged extending in the axial direction of the rotor shaft 8. In FIG. 1, a portion of the rotor core 100 is illustrated as broken away for visualization of a portion of the core slots 2 and 52. As illustrated in FIG. 1, a widened portion 10 (recess) having a slot width greater than other portions is arranged in the outer circumferential sides of the core slots 2 and 52 of the rotor core 100. As described below, this widened portion 10 is arranged at a portion abutting the flared portion arranged centrally in the axial direction in the outer circumferential side of the rotor conductor inserted in the core slots 2 and 52.

Figure 2:
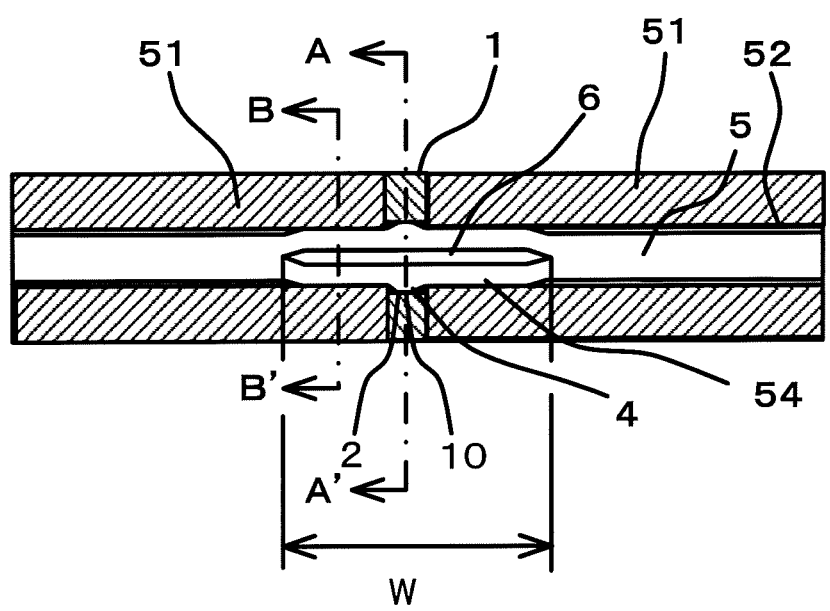
FIG. 2 is a magnified view of a broken-away portion of FIG. 1.

FIG. 2 illustrates a magnified view of a cross section of the broken-away portion of FIG. 1. In FIG. 2, a rod-like rotor conductor 5 is inserted in the core slot 2.

The rotor core 100 is formed by two types of cores, core 1 and core 51. The core 1 is disposed at a central portion with respect to the axial direction of the rotor shaft 8. The core 1 is formed by stacking 10 to 20 core plates. For example, in the case of core plates of 0.5 mm thickness, the overall thickness of the core 1 is 5 mm to 10 mm. The core 51 is disposed at both rotor shaft 8 axial-direction sides of the core 1 and sandwiches the core 1. The core 51 is formed by stacking core plates. The majority of the rotor core 100 is formed by the core 51.

The core slot 2 is formed by the core 1, and the core slot 52 is formed by the core 51. The core slot 2 and the core slot 52 have different cross-sectional shapes.

Figure 3:
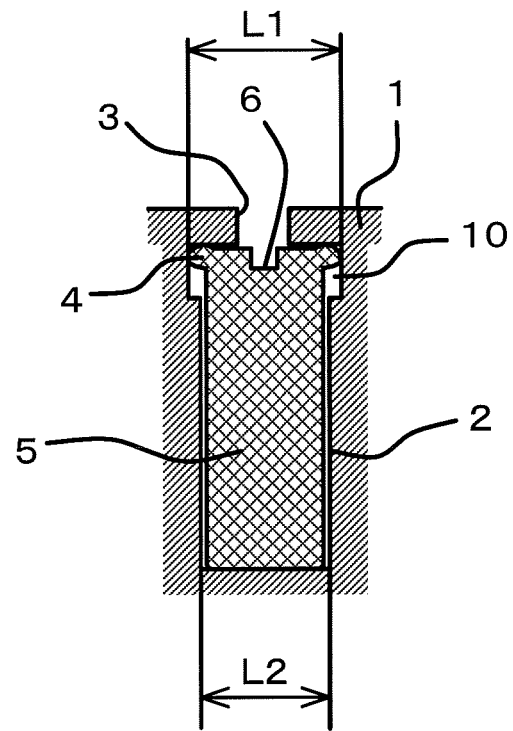
FIG. 3 is a cross-sectional drawing taken along line A-A' in FIG. 2.

FIG. 3 illustrates a cross section taken along line A-A' in FIG. 2. As illustrated in FIG. 3, at the outer circumferential edge of the core slot 2 of the core 1, a semi-opening part 3 is arranged that has an opening restricted in size to about one half the size of the core slot 2. A width L1 of the outer circumferential side of the core slot 2 arranged in the core 1 is larger than a width L2 of the inner circumferential side.

Figure 4:
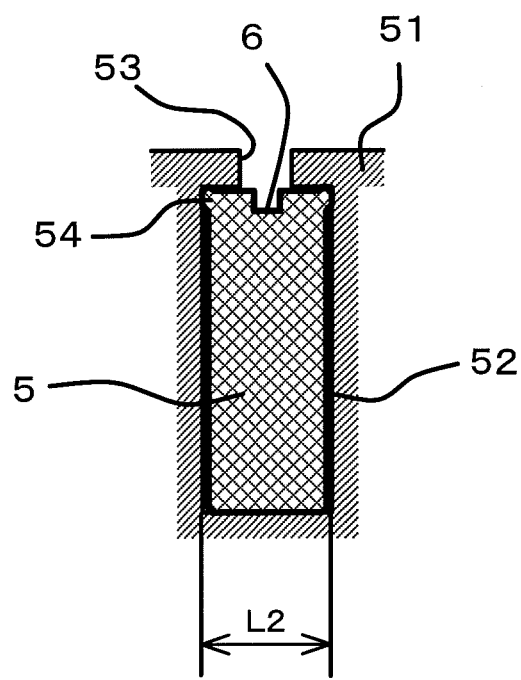
FIG. 4 is a cross-sectional drawing taken along line B-B' in FIG. 2.

FIG. 4 illustrates a cross section taken along line B-B' in FIG. 2. As illustrated in FIG. 4, at the outer circumferential edge of the core slot 52 of the core 51, a semi-opening part 53 is arranged that has an opening restricted in size to about one half the size of the core slot 52. The width of the core slot 52 arranged in the core 51 is uniform. The width of the core slot 52 is the same as the inner circumferential side width L2.

In this manner, among the core slots 2 and 52, only the outer circumferential side width of the core slot 2 is increased. Thus the widened portion 10 is formed, and an unevenness is formed along the axial direction of the rotor shaft 8 at the outer circumferential side of the inner walls of the core slots 2 and 52.

Figure 5:
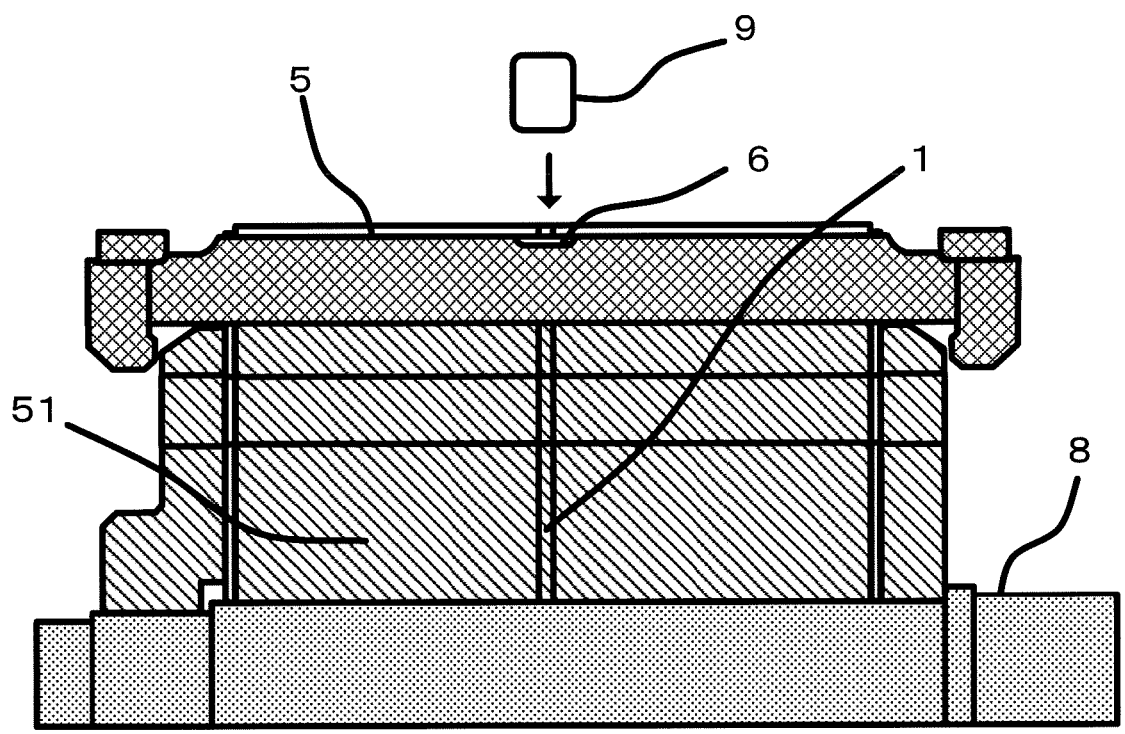
FIG. 5 is a vertical cross-sectional drawing of the rotor core.

FIG. 5 illustrates a vertical cross section, taken along the axis of the rotor shaft 8, of the rotor core 100. As illustrated in FIG. 3, FIG. 4, and FIG. 5, the rotor conductor 5 is inserted in the core slots 2 and 52. Further, swaging is performed that indents the axial-direction central portion of the outer circumferential surface of the rotor conductor 5 by a pressing force by pressing a chisel 9, from the semi-opening parts 3 and 53 of the outer circumferential end of the core slots 2 and 52 of the cores 1 and 51, against the outer circumferential surface of the rotor conductor 5. Due to this swaging, a swage slot 6 (length W) is formed in the transverse-direction central portion of the outer circumferential portion of the rotor conductor 5 as illustrated in FIG. 2, FIG. 3, and FIG. 4. By this means, a portion of the outer circumferential side of the rotor conductor 5 expands in the transverse direction of the slot, and flared portions 4 and 54 are formed. These expanded portions of the outer circumferential side, that is, the flared portions 4 and 54, are in a state in which the flared portions 4 and 54 are pressed against both side wall surfaces of the core slots 2 and 52, and a propping-apart force is generated between these portions and both side wall surfaces. As a result, the rotor conductor 5 is fixed to the core slots 2 and 52.

In this squirrel-cage induction motor, an unevenness, such as the widened portion 10, is formed as described above in the inner wall of the outer circumferential side of the core slot 2. The flared portion 4 is formed at the portion (of the core slot 2) abutting the widened portion 10, and the flared portion 54 is formed at the portion abutting the core slot 52. Due to this unevenness, when the chisel 9 is pressed into the surface of the outer circumferential side of the rotor conductor 5, a difference occurs between the widened portion 10 and the other portions, in the size of the expansion in the transverse direction of the rotor conductor 5 at the central portion with respect to the axial direction of the rotor shaft 8, and the flared portion 4 is larger than the flared portion 54 of both sides sandwiching the central portion with respect to the axial direction of the rotor shaft 8. As a result, a step is provided between the flared portion 4 and the flared portion 54 corresponding to the step between the widened portion 10 and the other portions.

The method for manufacturing the squirrel-cage induction motor is described below.

Firstly, the cores 1 and 51 are stacked to form the rotor core 100. The core slot 2 of the core 1 and the core slot 52 of the core 51 have different cross-sectional shapes, and thus an unevenness is formed along the axial direction of the rotor shaft 8 in the inner walls of the outer circumferential side of the rotor core slots 2 and 52. Thereafter, the rotor conductor 5 is inserted in the core slots 2 and 52. Thereafter, swaging is performed to indent the transverse-direction central portion of the outer circumferential surface of the rotor conductor 5 by a pressing force using the chisel 9 via the semi-opening parts 3 and 53. As a result, as illustrated in FIG. 2, FIG. 3, and FIG. 4, flare portions 4 and 54 are formed by expanding the outer circumferential portion of the rotor conductor 5 in the transverse direction of the core slots 2 and 52, to result in the state in which the flared portions 4 and 54 are pressed against both side wall surfaces of the core slots 2 and 52 into which the rotor conductor 5 is inserted. Relative movement between the rotor conductor 5 and the core slots 2 and 52 does not occur even when the rotor conductor 5 is acted upon by a force less than static friction force, which is the static friction coefficient of the contacting surfaces multiplied by the force pressing against the wall surface, and the rotor conductor 5 remains fixed to the core slots 2 and 52.

This squirrel-cage induction motor according to Embodiment 1 is configured such that the width L1 of the outer circumferential side of the core slots 2 arranged in the core 1 is wider than the width L2 of the outer circumferential side of the core slots 52 arranged in the core 51. By this means, as illustrated in FIG. 2, a state occurs in which a step is arranged between the slot-transverse direction flared portion 4 of the outer circumferential portion of the rotor conductor 5 of the portion of the core slot 2 arranged in the core 1 and the slot-transverse direction flared portion 54 of the outer circumferential portion of the rotor conductor 5 of the portion of the core slot 52 arranged in the core 51.

As described above, the rotor conductor 5 is deformed due to rapid changes in the current induced by the rotary magnetic field, and the rotor conductor 5 expands and contracts due to temperature changes resulting from the induced current. Further, the rotor conductor 5 is affected by centrifugal force due to rotation and by external vibration. However, due to the step between the flared portion 4 and the flared portion 54, movement of the rotor conductor 5 in the axial direction of the rotor shaft 8 relative to the rotor core 100 can be prevented.

Figure 6:
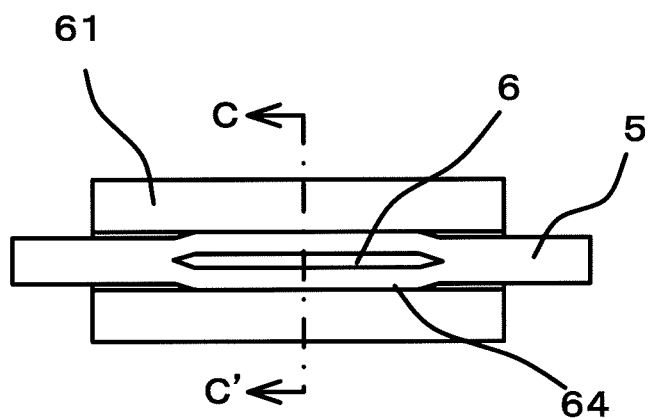
FIG. 6 is an upper-surface view of a rotor conductor flared portion of a conventional squirrel-cage induction motor.
Figure 7:
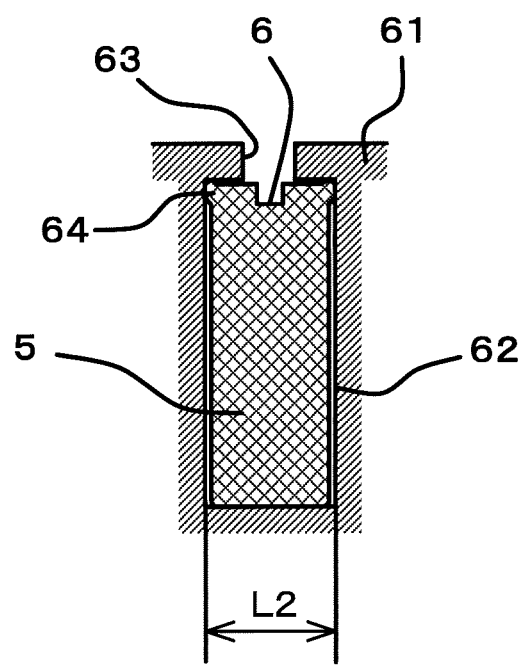
FIG. 7 is a cross-sectional drawing taken along line C-C' in FIG. 6.

In contrast, in the conventional squirrel-cage induction motor, the rotor core is formed from one type of a core 61, as illustrated in FIG. 6 and FIG. 7. The entire core slot 62 arranged in the core 61 has the same width L2. Thus the width of a flared portion 64 of the rotor conductor 5 provided by swaging via a semi-opening part 63 is uniform. Thus the fixing of the rotor conductor 5 to the core slot 62 is achieved only by the force of propping against both side wall surfaces of the core slot 62.

In Embodiment 1 in the aforementioned manner, an unevenness is arranged along the axial direction of the rotor shaft 8 in the inner walls of the outer circumferential side of the rotor core slots 2 and 52 abutting the flared portions 4 and 54. Thus the rotor conductor 5 has the flared portions having different sizes of transverse-direction expansion of the rotor conductor 5 between the portion abutting the recess (widened portion 10) and the other portions, and thus the flared portions 4 and 54 also have an unevenness arranged along the axial direction of the rotor shaft 8 when the flared portions 4 and 54 are formed. Due to the step due to this unevenness, even when the force of propping between the rotor conductor 5 and both side wall surfaces of the core slots 2 and 52 is decreased by micro-deformation and abrasion over time, movement of the rotor conductor 5 in the axial direction of the rotor shaft 8 relative to the rotor core 100 can be prevented.

Embodiment 2

Embodiment 2 of the present disclosure is described below.

Figure 8:
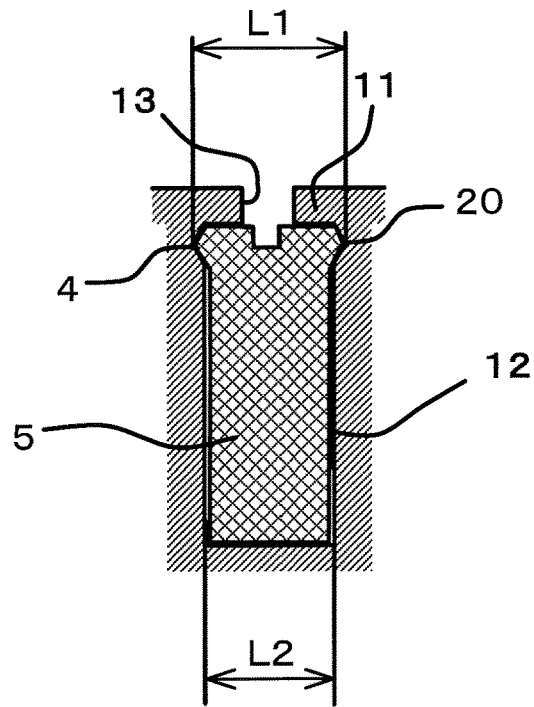
FIG. 8 is a cross-sectional drawing of a slot portion of the rotor core of the squirrel-cage induction motor according to Embodiment 2 of the present disclosure.

Configuration of the rotor of the squirrel-cage induction motor according to Embodiment 2 is the same as the configuration of the rotor of the squirrel-cage induction motor according to Embodiment 1, except for, rather than the core 1, the use of a core 11 having a core slot 12 illustrated in FIG. 8 as the core of the central portion in the axial direction of the rotor shaft 8 of the rotor core 100.

As illustrated in FIG. 8, the cove slot 12 of the core 11 includes a widened portion 20 in the outer circumferential side of the rotor core 100. At the widened portion 20, a v-shaped recess is formed along the radial direction of the rotor core 100 in the inner wall as viewed from the axial direction of the rotor shaft 8. At the widened portion 20, the maximum slot width is L1. Slot width of the portion other than the widened portion 20 is L2, which is shorter than L1.

In Embodiment 2 in the same manner as the aforementioned Embodiment 1, among the flared portions 4 and 54 formed by swaging via semi-opening parts 13 and 53, width of the flared portion 4 of the outer circumferential portion of the rotor conductor 5 is greater than width of the flared portion 54 of the outer circumferential portion of the rotor conductor 5 except for the central portion in the axial direction of the rotor core 100 (see FIG. 2). Thus a step is arranged contacting the step of the core slots 12 and 52 between the flared portion 4 and the flared portion 54. Thus relative movement of the rotor conductor 5 in the axial direction of the rotor shaft 8 relative to the rotor core 100 can be prevented.

Further, in Embodiment 2, the flared portion 4 of the rotor conductor 5 engages both side wall surfaces of the core slot 12 at a v-shaped interface along the radial direction of the rotor core 100. Due to this flared portion 4, movement relative to the rotor core 100 in the slot-transverse direction and the rotor shaft 8 axial direction can be prevented, and movement relative to the rotor core 100 in the radial direction can also be prevented.

Embodiment 3

Embodiment 3 of the present disclosure is described below.

Figure 9:
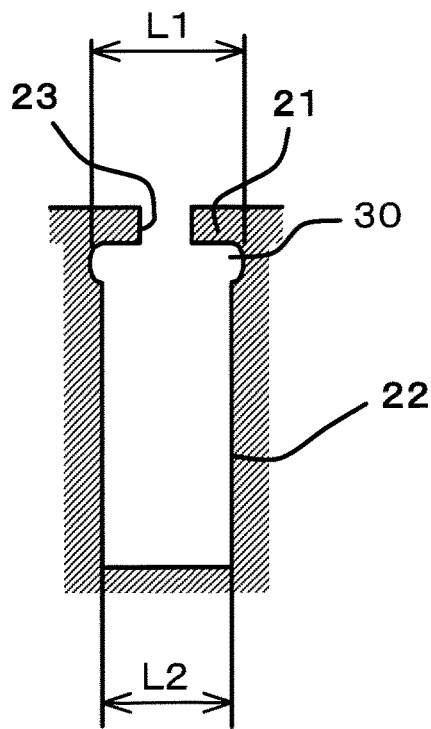
FIG. 9 is a cross-sectional drawing of the slot portion of the rotor core of the squirrel-cage induction motor according to Embodiment 3 of the present disclosure.

Configuration of the rotor of the squirrel-cage induction motor according to Embodiment 3 is the same as the aforementioned configuration of the rotor of the squirrel-cage induction motor according to Embodiment 1, except for, rather than the core 1, the use of a core 21 having a core slot 22 illustrated in FIG. 9 as the core of the central portion in the axial direction of the rotor shaft 8 of the rotor core 100.

In the core slot 22 of the core 21, a widened portion 30 is formed in the outer circumferential side. Maximum slot width of the widened portion 30 is L1. Slot width of the portions other than the widened portion 30 is L2. Due to configuration in this manner, width of the flared portion 4 formed so as to abut against the widened portion 30 by swaging via a semi-opening part 23 is greater than or equal to width of the flared portion 54 of the rotor conductor 5 in the portions other than the rotor core 100 axial-direction central portion (see FIG. 2). Thus in the same manner as in the aforementioned Embodiment 1, between the flared portion 4 and the flared portion 54, a step is arranged that corresponds to the step in the core slots 22 and 52. Thus relative movement of the rotor conductor 5 in the axial direction of the rotor shaft 8 can be prevented.

Further, as viewed from the axial direction of the rotor shaft 8, the inner wall at the widened portion 30 has a rounded concave shape along the radial direction of the rotor core 100. Thus movement of the rotor core 100 relative to the slot-transverse direction and the axial direction of the rotor shaft 8 can be prevented, and relative movement in the radial direction of the rotor core 100 can be prevented.

Furthermore, in Embodiment 3, the number of corner portions in the inner wall of the core slot 22 is decreased relative to that of Embodiment 1. Thus working life of a punching die used for punching the core 21 forming the rotor core 100 can be prolonged relative to the aforementioned Embodiments 1 and 2.

Embodiment 4

Embodiment 4 of the present disclosure is described below.

Figure 10:
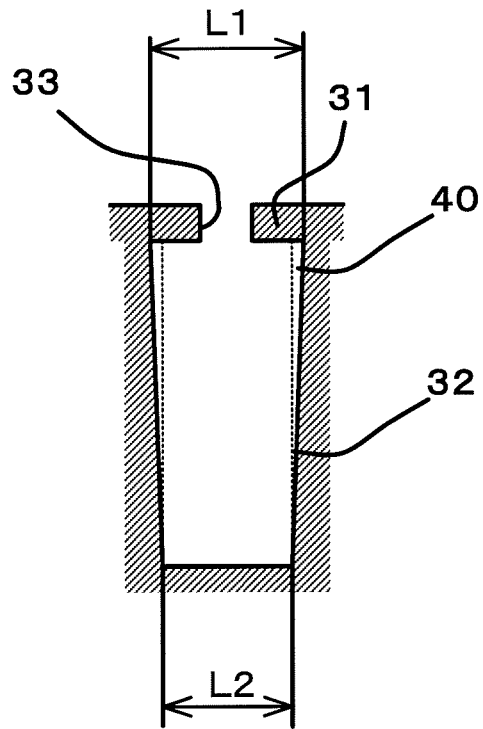
FIG. 10 is a cross-sectional drawing of the slot portion of the rotor core of the squirrel-cage induction motor according to Embodiment 4 of the present disclosure.

Configuration of the rotor of the squirrel-cage induction motor according to Embodiment 4 is the same as the aforementioned configuration of the rotor of the squirrel-cage induction motor according to Embodiment 1, except for, rather than the core 1, the use of a core 31 having a core slot 32 illustrated in FIG. 10 as the core of the central portion in the axial direction of the rotor shaft 8 of the rotor core 100.

As illustrated in FIG. 10, the cross-sectional shape of the core slot 32 of the core 31 has a tapered shape in which the outer circumferential side of the rotor core 100 widens and the bottom portion narrows. That is to say, in the present embodiment, a widened portion 40 is arranged from the outer circumferential side of the rotor core 100 to the bottom portion. The maximum slot width of the widened portion 40 is L1, and the minimum slot width is L2. Due to configuration in this manner, width of the flared portion 4 formed at the axial-direction central portion of the rotor core 100 by swaging via a semi-opening part 33 is greater than width of the flared portion 54 of the rotor conductor 5 at portions other than the axial-direction central portion of the rotor core 100 (see FIG. 2). Thus in the same manner as in the aforementioned Embodiment 1, between the flared portion 4 and the flared portion 54, a step is arranged in response to the step in the core slots 32 and 52. Thus relative movement of the rotor conductor 5 in the axial direction of the rotor shaft 8 can be prevented.

Furthermore, the number of corner portions occurring in the inner wall of the core slot 32 is decreased relative to that of the aforementioned Embodiment 1, and thus working life of a punching die used for punching the core slot 32 can be prolonged relative to core 1 according to Embodiment 1.

Embodiment 5

Embodiment 5 of the present disclosure is described below.

Figure 11:
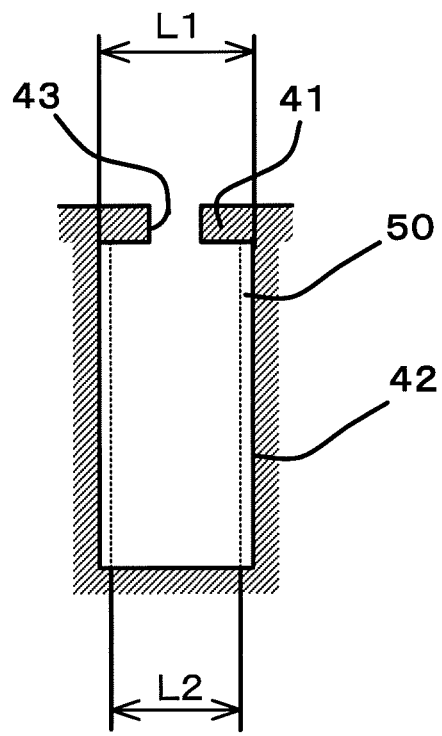
FIG. 11 is a cross-sectional drawing of the slot portion of the rotor core of the squirrel-cage induction motor according to Embodiment 5 of the present disclosure.

Configuration of the rotor of the squirrel-cage induction motor according to Embodiment 5 is the same as the aforementioned configuration of the rotor of the squirrel-cage induction motor according to Embodiment 1, except for, rather than the core 1, the use of a core 41 having a core slot 42 illustrated in FIG. 11 as the core of the central portion in the axial direction of the rotor shaft 8 of the rotor core 100.

As illustrated in FIG. 11, the cross section of the core slot 42 of the core 41 has a rectangular shape that is wider than the width of the core slot 52 of portions other than the central portion in the axial direction of the rotor core 100. That is to say, in the present embodiment, a widened portion 50 is arranged from the outer circumferential side of the rotor core 100 to the bottom portion, and the cross section of the widened portion 50 is rectangular. The slot width of the widened portion 50 is L1. Due to configuration in this manner, width of the flared portion 4 formed by swaging through a semi-opening part 43 is wider than width of the flared portion 54 (see FIG. 2). Thus between the flared portion 4 and the flared portion 54 a step is arranged in response to the step between the core slots 42 and 52. As a result, in the same manner as the aforementioned Embodiment 1, movement of the rotor conductor 5 in the axial direction of the rotor shaft 8 can be prevented.

Furthermore, the number of corner portions occurring in the inner wall of the core slot 42 is decreased relative to that of the aforementioned Embodiment 1. Thus working life of a punching die used for punching the core slot 42 forming the rotor core 100 can be prolonged relative to the aforementioned core 1 of Embodiment 1.

Embodiment 6

Embodiment 6 of the present disclosure is described below.

Figure 12:
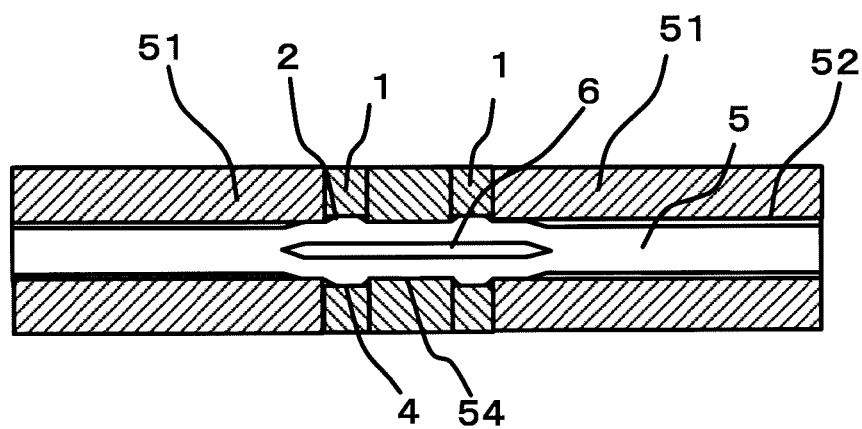
FIG. 12 is an upper-surface view of the rotor conductor flared portion within the slot of the rotor core of the squirrel-cage induction motor according to Embodiment 6 of the present disclosure.

As illustrated in FIG. 12, configuration of the rotor of the squirrel-cage induction motor according to Embodiment 6 is the same as the aforementioned configuration of the rotor of the squirrel-cage induction motor according to Embodiment 1 in that the core 1 and 51 are arranged as the core of the rotor core 100.

In the present embodiment, as illustrated in FIG. 12, cores 1 are disposed in multiple locations, and the core 51 is disposed between the cores 1. Due to configuration in this manner, multiple widened portions can be arranged in the axial direction of the rotor shaft 8, and the number of steps in the axial direction of the rotor shaft 8 can be increased. Thus relative movement of the rotor conductor 5 in the axial direction of the rotor shaft 8 can be more strongly prevented. Further, when using the core 11, the core 21, the core 31, or the core 41 instead of core 1 as the core of the rotor core 100, relative movement of the rotor conductor 5 in the axial direction of the rotor shaft 8 in the aforementioned manner can be more strongly prevented.

Embodiment 7

Embodiment 7 of the present disclosure is described below.

Figure 13:
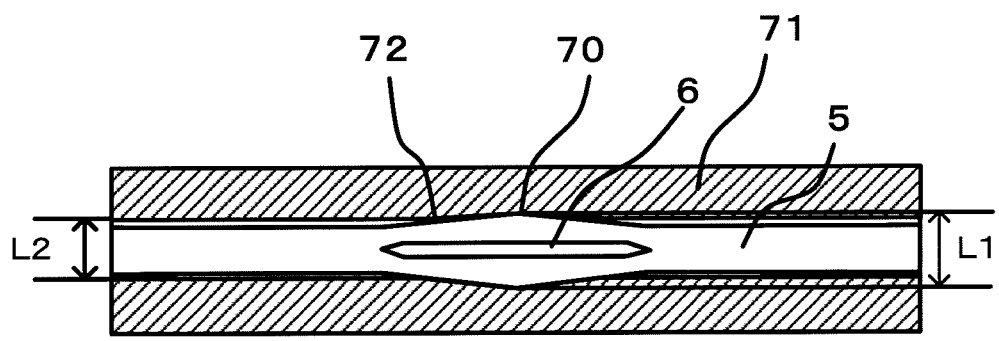
FIG. 13 is an upper-surface view of the rotor conductor flared portion within the slot of the rotor core of the squirrel-cage induction motor according to Embodiment 7 of the present disclosure.

Configuration of the rotor of the squirrel-cage induction motor according to Embodiment 7 is the same as the aforementioned configuration of the rotor of the squirrel-cage induction motor according to Embodiment 1, except for, rather than the core 1, the use of a core 71 having a core slot 72 illustrated in FIG. 13 as the core of the central portion in the axial direction of the rotor shaft 8 of the rotor core 100.

As illustrated in FIG. 13, the core slot 72 of the core 71 is a concave slot for which the slot width of the inner walls of a widened portion 70 corresponding to the flared portion formed in the rotor shaft 8 axial direction central portion by swaging changes in the axial direction of the rotor shaft 8. The widened portion 70 having this type of inner wall is formed by stacking of core plates having gradually different slot widths in order of increasing or decreasing slot width. Maximum slot width of the widened portion 70 is L1. In this configuration, although the inner wall of the core slot 72 in the axial direction of the rotor shaft 8 has a concave shape, the shape of the flared portion of the rotor conductor 5 has a projection along this concave shape. Thus movement of the rotor conductor 5 in the axial direction of the rotor shaft 8 relative to the rotor core 100 can be prevented.

Embodiment 8

Embodiment 8 of the present disclosure is described below.

Figure 14:
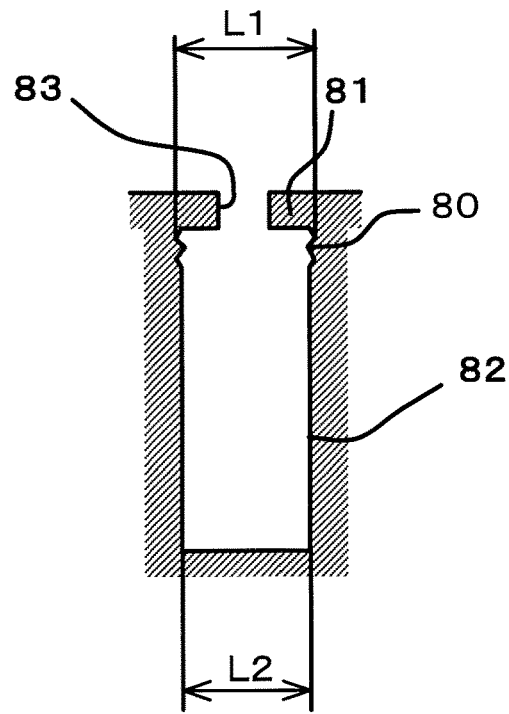
FIG. 14 is a cross-sectional drawing of the slot portion of the rotor core of the squirrel-cage induction motor according to Embodiment 8 of the present disclosure.

Configuration of the rotor of the squirrel-cage induction motor according to Embodiment 8 is the same as the aforementioned configuration of the rotor of the squirrel-cage induction motor according to Embodiment 1, except for, rather than the core 1, the use of a core 81 having a core slot 82 illustrated in FIG. 14 as the core of the central portion in the axial direction of the rotor shaft 8 of the rotor core 100.

As illustrated in FIG. 14, for the cove slot 82 of the core 81, the shape of the inner wall of a widened portion 80 corresponding to the flared portion formed in the rotor shaft 8 axial direction central portion by swaging via a semi-opening part 83 is w-shaped along the radial direction of the rotor core 100 as viewed from the rotor shaft 8 axial direction. The maximum slot width of the widened portion 80 is L1, and the slot width of the other portion is L2. Thus movement of the rotor conductor 5 in the radial direction relative to the rotor core 100 can be prevented. Further, the number of steps along the radial direction of the rotor core 100 can be increased. Thus relative movement of the rotor conductor 5 in the axial direction of the rotor shaft 8 can be more strongly prevented.

Embodiment 9

Embodiment 9 of the present disclosure is described below.

Figure 15:
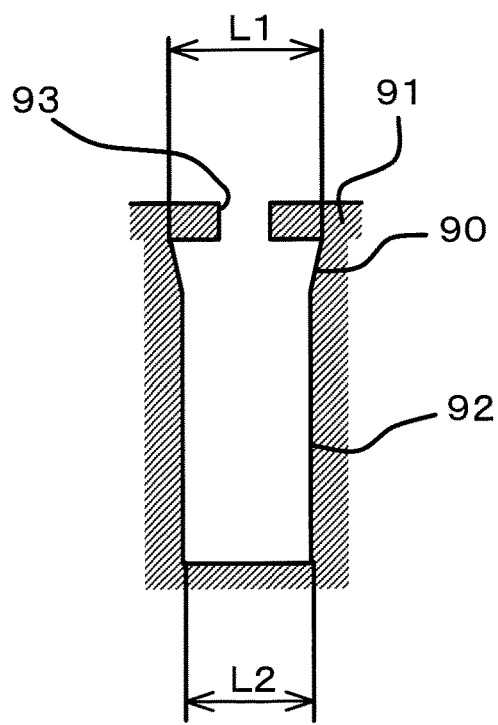
FIG. 15 is a cross-sectional drawing of the slot portion of the rotor core of the squirrel-cage induction motor according to Embodiment 9 of the present disclosure.

Configuration of the rotor of the squirrel-cage induction motor according to Embodiment 9 is the same as the aforementioned configuration of the rotor of the squirrel-cage induction motor according to Embodiment 1, except for, rather than the core 1, the use of a core 91 having a core slot 92 illustrated in FIG. 15 as the core of the central portion in the axial direction of the rotor shaft 8 of the rotor core 100.

As illustrated in FIG. 15, for the core slot 92 of the core 91, the inner wall at a widened portion 90 corresponding to the flared portion formed in the rotor shaft 8 axial direction central portion by swaging via a semi-opening part 93 has a tapered shape which narrows from the outer circumferential side toward the bottom portion. The maximum slot width of a widened portion 90 is L1. Due to configuration in this manner, relative movement of the rotor conductor 5 in the radial direction of the rotor core 100 can be prevented.

As described above in detail, the unevenness is arranged along the axial direction of the rotor shaft 8 in the inner wall of the slot of the rotor core 100 in each of the aforementioned various embodiments. Thus by swaging performed to fix the rotor conductor 5 inserted into the slot of the rotor core 100, when the flared portion flaring out in the slot-transverse direction is formed in the outer circumferential side of the rotor core 100, differences, of the flared portion flaring out in the slot-transverse direction, occur in the size of expansion in the transverse direction of the rotor conductor 5 along the unevenness of the inner wall of the slot of the rotor core 100, and thus the unevenness is arranged also in the flared portion in the rotor shaft 8 axial direction. Thus even when the force of propping between the rotor conductor 5 and both side wall surfaces of the rotor core slot decreases due to micro-deformation and abrasion over time, movement of the rotor conductor 5 in the axial direction of the rotor shaft 8 relative to the rotor core 100 can be prevented.

Further, the shape of the inner wall of the widened portion is not limited to the shapes of each of the aforementioned embodiments. For example, the shape of the inner wall may be trapezoidal.

Further, shape of the unevenness formed on the inner wall of the rotor core slot in each of the aforementioned embodiments may be reversed by changing the recess into a projection. That is to say, the projection or recess may be inverted. Further, the unevenness formed along the axial direction of the rotor shaft 8 may be arranged in only a single inner wall of the rotor core slot.

Further, in each of the aforementioned embodiments, although the flared portion is formed by swaging, a method other than swaging may be used to form the flared portion.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is used with advantage as a structure for the rotor of a squirrel-cage type inductor motor.

REFERENCE SIGNS LIST 1, 11, 21, 31, 41, 51, 61, 71, 81, 91 Core
2, 12, 22, 32, 42, 52, 62, 72, 82, 92 Core slot
3, 13, 23, 33, 43, 53, 63, 83, 93 Semi-opening part
4, 54, 64 Flared portion
5 Rotor conductor
6 Swage slot
8 Rotor shaft
9 Chisel
10, 20, 30, 40, 50, 70, 80, 90 Widened portion
22 Core slot
100 Rotor core

The invention claimed is:

1. A squirrel-cage induction motor comprising:
a rotor core comprising slots extending in an axial direction of the rotor core in an outer circumferential side of the rotor core; and
a rotor conductor having a rod shape and inserted in each slot of the slots, wherein
after insertion of the rotor conductor in the slot, a flared portion is formed in an outer circumferential side of the rotor conductor by flaring of the conductor in a transverse direction of the slot, and the rotor conductor is fixed to the slot by a propping-apart force occurring between the flared portion and both side walls of the slot, and
for each of the slots, at least one unevenness is formed in an inner wall of the outer circumferential side of the slot abutting the flared portion, such that a slot width changes along the axial direction of the rotor core, the unevenness comprising at least one of a recess or a projection.

2. The squirrel-cage induction motor according to claim 1, wherein a step as the unevenness is disposed along the axial direction of the rotor core in the inner wall of the slot.

3. The squirrel-cage induction motor according to claim 2, wherein the unevenness comprises at least one recess, and an inner wall of the at least one recess of the unevenness is a recessed shape along a radial direction of the rotor core.

4. The squirrel-cage induction motor according to claim 3, wherein the inner wall of the recess of the unevenness along the radial direction is v-shaped or rounded.

5. The squirrel-cage induction motor according to claim 1, wherein a recess of the unevenness is disposed from an outer circumference of the slot to a bottom portion of the slot.

6. The squirrel-cage induction motor according to claim 5, wherein the recess is taper-shaped, and
width of an outer circumference portion of the recess is wider than width of the bottom portion of the recess.

7. The squirrel-cage induction motor according to claim 1, wherein the flared portion is formed by expansion of the rotor conductor in a transverse direction of the slot by indenting a central portion of an outer circumferential surface of the rotor conductor by a pressing force applied via a semi-opening of the slot.

8. A method for manufacturing a squirrel-cage induction motor, comprising:
forming, in slots extending in an axial direction of a rotor core in an outer circumferential side of the rotor core, at least one unevenness along the axial direction of the rotor core;
inserting a rotor conductor having a rod shape in each of the slots; and
forming in an outer circumferential side of the inserted rotor conductor a flared portion flaring in a transverse direction of a respective slot at a portion of the rotor conductor abutting the unevenness, the rotor conductor being fixed to the slot by a propping-apart force occurring between the flared portion and both side walls of the slot, the at least one unevenness being formed in an inner wall of the outer circumferential side of the slot such that a slot width changes along the axial direction of the rotor core, the unevenness comprising at least one of a recess or a projection.

9. The squirrel-cage induction motor according to claim 1, wherein the at least one unevenness is two unevennesses, each unevenness being in one side of the inner wall of the outer circumferential side of the slot.

10. The squirrel-cage induction motor according to claim 9, wherein a step as the unevenness is disposed along the axial direction of the rotor core in the inner wall of the slot.

11. The squirrel-cage induction motor according to claim 10, wherein the unevenness comprises at least one recess, and an inner wall of the at least one recess of the unevenness is a recessed shape along a radial direction of the rotor core.

12. The squirrel-cage induction motor according to claim 11, wherein the inner wall of the recess of the unevenness along the radial direction is v-shaped or rounded.

13. The squirrel-cage induction motor according to claim 9, wherein the recess of the unevenness is disposed from an outer circumference of the slot to a bottom portion of the slot.

14. The squirrel-cage induction motor according to claim 13, wherein the recess is taper-shaped, and
width of an outer circumference portion of the recess is wider than width of the bottom portion of the recess.

15. The squirrel-cage induction motor according to claim 9, wherein the flared portion is formed by expansion of the rotor conductor in a transverse direction of the slot by indenting a central portion of an outer circumferential surface of the rotor conductor by a pressing force applied via a semi-opening of the slot.

16. The squirrel-cage induction motor according to claim 1, wherein the at least one recess is a plurality of recesses disposed along the axial direction of the rotor core, each recess of the plurality of recesses being disposed in the inner wall of the slot.

17. The squirrel-cage induction motor according to claim 9, wherein the at least one recess is a plurality of recesses disposed along the axial direction of the rotor core, each recess of the plurality of recesses being disposed in the inner wall of the slot.

18. The method for manufacturing of a squirrel-cage induction motor according to claim 8, wherein
the at least one unevenness is two unevennesses, each unevenness being in one side of the inner wall of the outer circumferential side of the slot, and
after inserting the rotor conductor having the rod shape in each of the slots, the flared portion is formed in the inserted rotor conductor such that the flared portion flares toward the each side of the inner wall and the rotor conductor abuts the two unevennesses.

19. The method for manufacturing of a squirrel-cage induction motor according to claim 8, wherein
the unevenness has a plurality of recesses disposed along the axial direction of the rotor core, each recess of the plurality of recesses being disposed in the inner wall of the slot, after inserting the rotor conductor having the rod shape in each of the slots, the flared portion is formed in the inserted rotor conductor such that the flared portion flares in the transverse direction of the slot and abuts each of the plurality of recesses of the rotor conductor.

20. The method for manufacturing of a squirrel-cage induction motor according to claim 18, wherein the unevenness has a plurality of recesses disposed along the axial direction of the rotor core, each recess of the plurality of recesses being disposed in the inner wall of the slot, after inserting the rotor conductor having the rod shape in each of the slots, the flared portion is formed in the inserted rotor conductor such that the flared portion flares in the transverse direction of the slot and abuts each of the plurality of recesses of the rotor conductor.

21. The squirrel-cage induction motor according to claim 1, wherein the flared portion is formed only centrally in an axial direction in the outer circumferential side of the rotor conductor.

22. The squirrel-cage induction motor according to claim 21, wherein the flared portion includes a portion contacting the recess and the remaining portion not contacting the recess, and the portion contacting the recess is more flared in the transverse direction than the remaining portion.

* * * * *